Aug. 22, 1933.  C. H. WILLIS  1,923,696
ELECTRIC VALVE CONVERTING APPARATUS
Filed Dec. 24, 1931
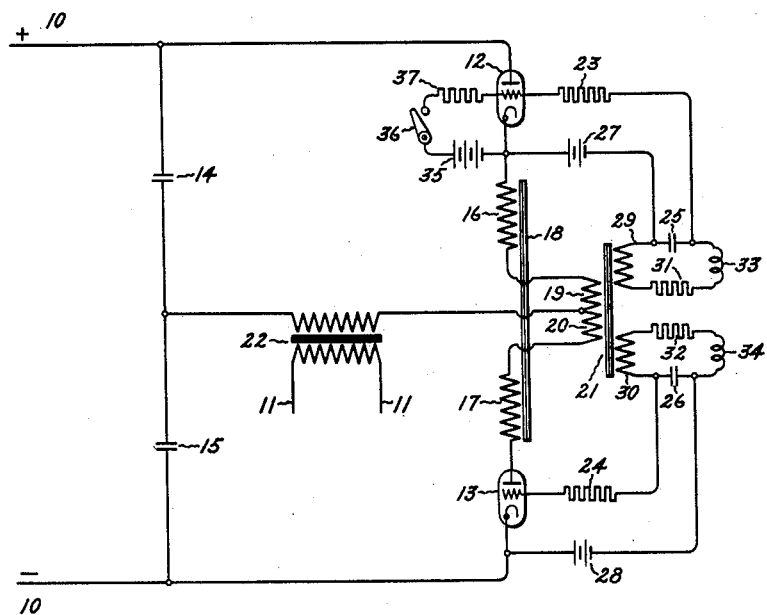
Inventor:
Clodius H. Willis,
by Charles E. Tullar
His Attorney.

Patented Aug. 22, 1933

1,923,696

UNITED STATES PATENT OFFICE 1,923,696

ELECTRIC VALVE CONVERTING APPARATUS

Clodius H. Willis, Princeton, N. J., assignor to General Electric Company, a Corporation of New York Application December 24, 1931
Serial No. 582,990

3 Claims. (Cl. 175—363)

My invention relates to electric valve converting apparatus and more particularly to such apparatus adapted to transmit energy between direct and alternating current circuits.

Heretofore there have been devised numerous electric valve converting apparatus for transmitting energy from a direct current circuit to an alternating current circuit. The use of electric valves of the vapor electric discharge type in such converting apparatus has been found particularly advantageous because of the relatively large amounts of power which may be handled at ordinary operating voltages. One type of electric valve converting apparatus in which vapor electric discharge valves may be satisfactorily employed is known in the art as a series inverter. Such an apparatus is described and claimed in United States Letters Patent 1,752,247, granted March 25, 1930, upon the application of Alan S. FitzGerald. The satisfactory operation of apparatus of this type utilizing vapor electric discharge valves is predicated upon the proper control of the conductivity of these valves by their respective control grids, and it is well understood in the art that such control can be maintained only when the electric valves are in a deionized condition. In circuits of this type, the time allowed for the deionization of the valves is that during which a negative anode potential is impressed upon the anodes of the electric valves and in certain arrangements of the prior art this deionization time is insufficient when operating at extremely high frequencies. In the copending application of Alan S. Fitz-Gerald, Serial No. 582,987, filed December 24, 1931, and assigned to the same assignee as the present application, there is disclosed and broadly claimed a series inverter utilizing vapor electric discharge valves in which a fixed deionization time is allowed for the valves irrespective of the operating conditions of the apparatus. My invention relates to electric valve converting apparatus of this latter type.

It is an object of my invention, therefore, to provide an improved electric valve converting apparatus of the type known in the art as a series inverter which will overcome the above-mentioned disadvantages of the arrangements of the prior art and which will be simple and reliable in operation.

It is a further object of my invention to provide an improved electric valve converting apparatus of the type known in the art as a series inverter in which each of the several electric valves is given a fixed deionization time irrespective of the operating conditions of the apparatus.

In accordance with one embodiment of my invention, I provide a capacitor, a pair of vapor electric discharge valves, a circuit for charging the capacitor from a source of direct current through one of said valves, and a circuit for discharging the capacitor including the other electric valve. An alternating current load circuit is coupled to both the charging and discharging circuits of the capacitors. The conductivity of each electric valve is controlled by a grid circuit including a negative bias battery for normally maintaining the valve non-conductive, and a saturable transformer having a primary winding connected in series with the other electric valve. With such an arrangement, when the current is interrupted in either valve, a positive potential impulse is impressed upon the grid of the other valve to render it conductive. If desired, a condenser may be included in the grid circuit to introduce a fixed time delay between the interruption of current in one valve and the starting of current in the other.

For a better understanding of my invention, together with other and further objects thereof, reference is had to the following description taken in connection with the accompanying drawing, and its scope will be pointed out in the appended claims. The single figure of the accompanying drawing illustrates an electric valve converting apparatus of the type known in the art as a series inverter embodying my invention.

Referring now to the drawing, there is illustrated an apparatus for transmitting energy from a direct current circuit 10 to an alternating current circuit 11, which apparatus includes a pair of electric valves 12 and 13 connected in parallel to a pair of capacitors 14 and 15, respectively, through the windings 16 and 17, respectively, of a reactor 18. The windings 16 and 17 are interconnected through the windings 19 and 20 of a transformer 21 while the junction between the windings 19 and 20 is interconnected with the junction between capacitors 14 and 15 through the primary winding of an output transformer 22, the secondary winding of which is connected to the alternating current circuit 11. The electric valves 12 and 13 are each provided with an anode, a cathode and a control grid and may be of any of the several types well known in the art, although I prefer to use valves of the vapor electric discharge type. If desired, either of the capacitors 14 or 15 may be omitted without affecting the operation of the apparatus.

In order to control the conductivities of the valves 12 and 13, their control grids are connected to their respective cathodes through current limiting resistors 23 and 24, capacitors 25 and 26, and negative bias batteries 27 and 28, respectively. Capacitors 25 and 26 are also connected in series with secondary windings 29 and 30 of the transformer 21, current limiting resistors 31 and 32, and reactors 33 and 34, respectively. The transformer 21 should be self-saturating or a self-saturating transformer should be interposed between the windings 29 and 30 and the grid circuits of the valves 12 and 13, or some other means should be provided for deriving periodic potentials of peaked wave form from the substantially sinusoidal current flowing in the primary windings 19 and 20, in order properly to excite electric valves 12 and 13. However, this feature of exciting the control grid of a vapor electric discharge valve with a periodic potential of peaked wave form comprises no part of my present invention, but is disclosed and broadly claimed in the copending application of B. D. Bedford, Serial No. 485,335, filed September 29, 1930, and assigned to the same assignee as the present application. In order to initiate the operation of the apparatus, the control grid of one of the electric valves, for example, valve 12, may be connected to its cathode through a positive bias battery 35, a switch 36 and a current limiting resistor 37.

The general principles of operation of the above-described apparatus will be well understood by those skilled in the art, or may be found explained in detail in the above-mentioned Fitz-Gerald patent. In brief, assuming that initially electric valve 12 is made conductive, current will flow from the upper positive direct current terminal through electric valve 12, winding 16 of reactor 18, primary winding of transformer 22 and capacitor 15 to the other side of the direct current circuit. When capacitor 15 becomes substantially completely charged, this current will automatically stop. If then electric valve 13 is made conductive, the capacitor 15 will discharge through the circuit comprising the primary winding of the transformer 22, the winding 17 of reactor 18 and electric valve 13. At the same time the capacitor 14 will become charged through the circuit including primary winding of transformer 22, and winding 17 of reactor 18 and electric valve 13. Similarly, during the succeeding half cycle, capacitor 14 will become discharged and the capacitor 15 will become charged, and this cycle may be repeated indefinitely. It will be noted that, during successive half cycles, the current flows in opposite directions through the primary winding of the transformer 22, thus generating an alternating potential for energizing the circuit 11. It will be noted also that, when current is started through either valve and its associated reactor winding, a potential will be induced in the other reactor winding which opposes the flow of current in that circuit and thus assists the deionization of the valve and in maintaining it non-conductive during the desired interval.

The manner in which the electric valves are successively rendered alternately conductive and non-conductive will now be explained by considering the initiation of the operation of the apparatus. Assume, for example, that the switch 36 is momentarily closed. Electric valve 12 is thus made conductive and an initial half cycle of alternating current will flow as explained above. When this first half cycle is completed, the current in the winding 19 is reduced to zero, which, because of the saturation of the transformer 21, is the point in the cycle at which a positive impulse is induced in the winding 30. This potential will tend to render the valve 13 conductive against the negative bias of the grid battery 28. By the proper selection of the constants of the resistor 32, the reactor 34 and the capacitor 26, any predetermined time delay may be introduced between the interruption of the current in the winding 19 and the occurrence of a positive potential across the capacitor 26 sufficient to overcome the negative bias of the battery 28. Similarly, when the current in the circuit including the valve 13 and the winding 17 is interrupted, a positive potential impulse will be induced in the winding 29 which will render the valve 12 conductive after a predetermined interval. In this manner a fixed time is introduced between the interruption of the current in one valve and the excitation of the other valve, and this time is practically independent of the various operating characteristics of the apparatus.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said capacitor circuits, a self-saturating transformer for exciting said control grids, said transformer including a winding in series relation with the current through each of said valves and time delay means interposed between said control grids and said transformer.

2. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit associated with one of said capacitor circuits, and a grid circuit for each of said valves including a self-saturating transformer and a capacitor, each of said transformers being provided with a primary winding connected in series with the valve controlled by the other transformer.

3. In combination, a source of current, a pair of vapor electric discharge valves each provided with a control grid, a capacitor, a circuit for charging said capacitor from said source including one of said valves, a circuit for discharging said capacitor including the other of said valves, an alternating current circuit common to said charging and discharging circuits, and a non-oscillatory grid circuit for each of said valves including a capacitor, a reactor and a self-saturating transformer, each of said transformers being provided with a primary winding connected in series with the other valve.

CLODIUS H. WILLIS.